129,463

UNITED STATES PATENT OFFICE.

SAMUEL H. CROCKER, OF PITTSBURG, PENNSYLVANIA.

IMPROVEMENT IN THE PURIFICATION OF PARAFFINE.

Specification forming part of Letters Patent No. 129,463, dated July 16, 1872.

SPECIFICATION.

*To all whom it may concern:*

Be it known that I, SAMUEL H. CROCKER, of Pittsburg, in the county of Allegheny and State of Pennsylvania, have invented a new and useful Improvement in the Manufacture of Paraffine; and I do hereby declare the following to be a full, clear, and exact description thereof:

Paraffine, as produced by the distillation of petroleum and by pressing, is obtained in a solid condition, but commonly discolored by the presence of objectionable matter. To produce an article suitable for use in the arts this coloring matter has to be removed. This is commonly done by melting the paraffine by the use of artificial heat, mixing it with benzine, and pressing.

In my improved process I still make use of the benzine, but under different conditions. Instead of melting the paraffine (or paraffine-wax, as it is called) I treat it in an unmelted state with benzine, which acts as a solvent and also as a purifying agent.

To enable others skilled in the art to make and use my improvement, I will proceed to describe the same.

I take the discolored paraffine or paraffine-wax, at about the ordinary temperature, as it is produced by distillation and pressing, and pulverize it or break it up into comparatively small pieces. To this I add a small proportion —say about one-fifth of the quantity of the wax, by measure—of benzine or other of the more volatile petroleum oils or oily products, (above forty-six degrees gravity, Baumé,) thus producing, at ordinary temperature, a semi-liquid or pasty mass. The benzine acts on the paraffine first as a solvent to bring it to this condition, and then as a purifying or refining agent by absorbing or uniting with the objectionable coloring matter, it having a greater affinity for the coloring matter than the paraffine has. To effect the complete dissolution of the paraffine, and to facilitate the absorption by the benzine of the impurities of the paraffine, a little warm water or milk should be added; or steam may be employed, so as to raise the temperature to about 80° or 90° Fahrenheit, and keeping it at about that point.

The proportion above given has to be varied somewhat, as it depends upon the quality of the paraffine or paraffine-wax. If comparatively pure, a less quantity will be required, and vice versa.

After being allowed to stand at the temperature stated awhile—say about an hour, more or less, long enough for the benzine to take up all the coloring matter it is capable of—the mixture may be put in bags and pressed or otherwise subjected to pressure in any known way. During the operation of pressing the mass is subjected to a warm bath of water or steam. The benzine, carrying the coloring matter off, is pressed out, and the solid paraffine left of a clear white color and ready for use; or, should it be necessary to secure a thorough cleansing or refining, the product thus obtained may be again pulverized and treated as before; or it may be merged in the solvent in a solidified state, which saves the trouble and labor of pulverizing it a second time, and answers almost as well.

I thus secure the desired result, saving the time, trouble, and expense of melting the paraffine by artificial heat.

What I claim as my invention, and desire to secure by Letters Patent, is—

In the process of purifying paraffine, subjecting the paraffine (dissolved as set forth) to the action of benzine or other light hydrocarbon at a temperature carried artificially above the melting point of the paraffine, (say 80° or 90° Fahrenheit,) and continuing them in solution, at about the temperature stated, till the benzine has taken up all the impurities of which it is capable, and then pressing the paraffine in a warm bath, substantially as set forth.

In testimony whereof I, the said SAMUEL H. CROCKER, have hereunto set my hand.

SAMUEL H. CROCKER.

Witnesses:
W. N. PAXTON,
THOS. B. KERR.